May 25, 1937.   J. WITTEK   2,081,878
VALVE
Filed May 27, 1935   2 Sheets-Sheet 2
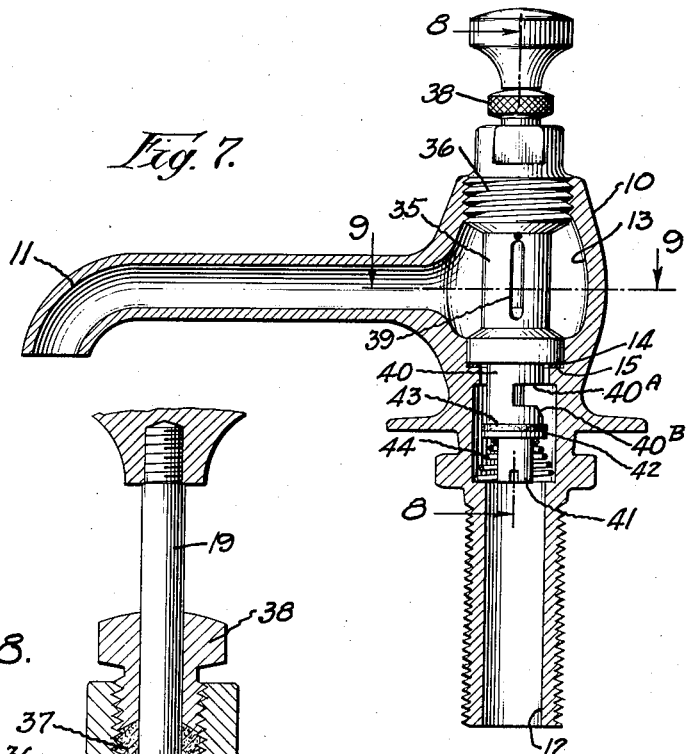
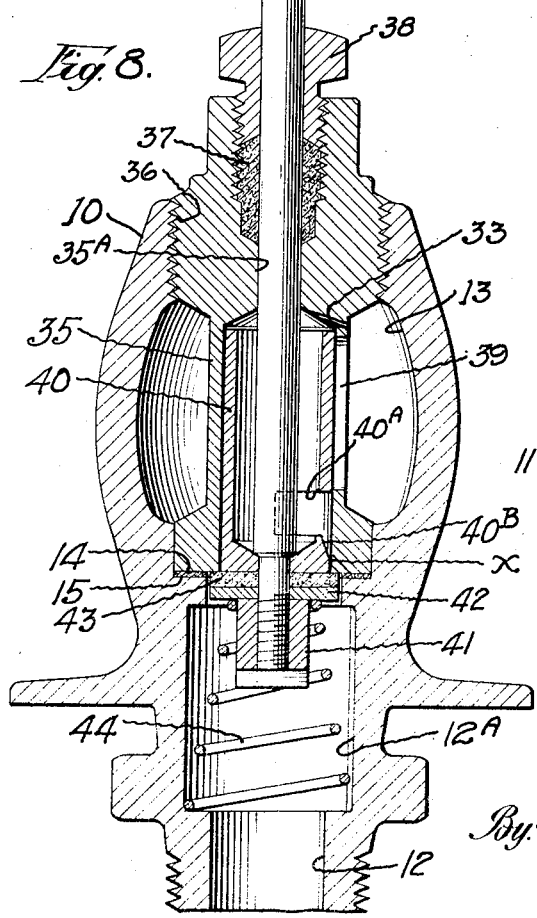
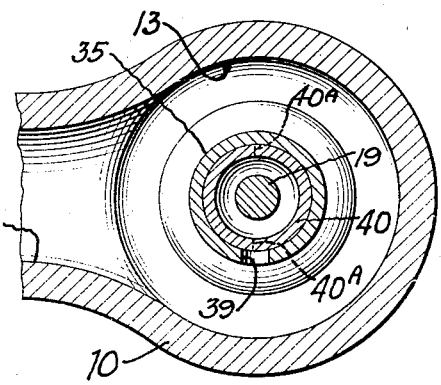
Inventor:
Joseph Wittek,
By: Frank Schraeder Jr
Att'y.

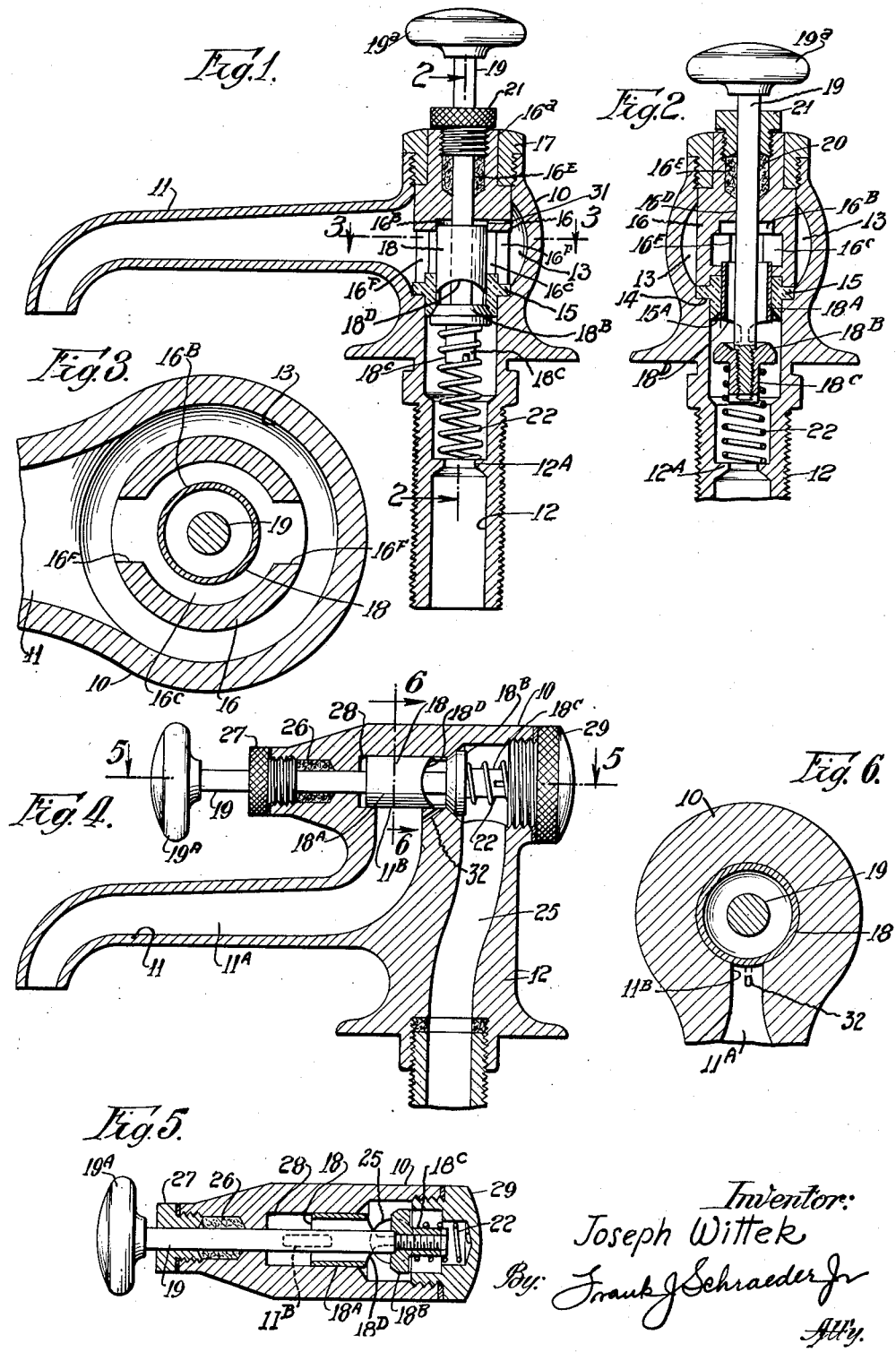

Patented May 25, 1937

2,081,878

UNITED STATES PATENT OFFICE 2,081,878

VALVE

Joseph Wittek, Pasadena, Calif.

Application May 27, 1935, Serial No. 23,531

7 Claims. (Cl. 277—42)

This invention relates to improvements in valves and has particular reference to new and useful improvements in valves which are particularly adaptable for controlling fluid lines in which fluids such as water, steam, or the like are under pressure.

An important object of the invention resides in the provision of an improved valve of the balanced type wherein a piston is utilized to co-operate with the valve element for controlling and regulating the flow of the fluid body under pressure, although, I do not wish to be understood as limiting the use of my valve invention to or for use for fluids under pressure, since the valve herein disclosed is readily adaptable for use in controlling and regulating the flow of fluids which are not considered to be influenced by pressure, but which flow, as for instance, by gravity.

It is also an object of the invention to provide a valve of the character above-described wherein the closing operation of the valve for a gravity-fed fluid may be made automatic upon the release of the valve operator, as by spring action, or wherein the operator in such gravity-fed valve may be maintained in set position so that the valve remains in a preset position to permit a continuous flow of the fluid, but in such valve the spring is not employed.

Another object of the invention is found in the provision of a valve which is simple in construction, low in cost of manufacture and efficient in operation.

With the above and other objects in view which will appear as the description proceeds, the invention consists in the novel combination of the parts and members shown in preferred embodiment in the attached drawings, described in the following specifications and particularly pointed out in the appended claims.

In the accompanying drawings wherein like reference numerals indicate like or corresponding parts:—

Figure 1 is a vertical section through a water faucet showing an application of my invention, and showing the valve in closed position;

Figure 2 is a vertical section taken on line 2—2 of Fig. 1 showing the valve in open position;

Figure 3 is an enlarged cross-section taken on line 3—3 of Fig. 1;

Figure 4 is a vertical section through a faucet of the horizontal type and embodying my invention and showing the valve in closed position;

Figure 5 is a cross-section taken on line 5—5 of Fig. 4;

Figure 6 is an enlarged cross-section taken on line 6—6 of Fig. 4;

Figure 7 is a vertical section of a faucet showing a modified form of my valve invention;

Figure 8 is an enlarged vertical section taken on line 8—8 of Fig. 7, and

Figure 9 is an enlarged cross-section taken on line 9—9 of Fig. 7.

Referring now to the valve as shown in Figs. 1 to 3 inclusive which show the adaption of my invention to a water faucet, the faucet casing 10 is provided with an outlet spout 11 and an inlet extension 12.

Within the casing 10 is an enlarged annular chamber 13 at the lower end of which is provided a seat 14 for a washer 15 of fiber or rubber or any other suitable material.

Within the casing 10 and seated upon the washer 15 is a tubular piston member 16 the upper end of which is decreased in diameter as at 16$^a$ and disposed into the screw cap 17 which is screw-mounted into the upper end of the casing 10.

The tubular piston member 16 is provided with a passage 16$^B$ for the piston 18 which passage 16$^B$ is enlarged to form an annular interior chamber 16$^C$.

At its lower end, the member 16 is recessed for the washer 15, and at its upper end, the member 16 is provided with a passage 16$^D$ for the valve operator rod 19. The passage 16$^D$ is enlarged as at 16$^E$ for the packing 20 and a packing nut 21 is screw-mounted into the upper end of the cap 17.

The piston 18 includes a tubular portion 18$^A$ which is open at one end, (or at the upper end as shown in Figs. 1 and 2) and at the opposite end is formed a circular valve portion 18$^B$ which is provided with an extension 18$^C$.

The valve operator or rod 19 is provided with a button-like head 19$^A$ and has a threaded connection at its lower end within the valve 18$^B$ and its extension 18$^C$.

The valve 18$^B$ is suitably faced to cooperate with a valve seat 15$^A$ formed at one end of the washer 15.

Adjacent to the valve portion 18$^B$, the tubular portion 18$^A$ is cut out, as at 18$^D$, to provide an inlet into the piston 18. I have preferred to show two of such inlets 18$^D$ provided by oppositely disposed openings 18$^D$.

To provide a normally automatically closed valve, a coil spring 22 is interposed below the valve 18$^B$ in such position that one end thereof is coiled around the extension 18ᶜ and the other end supported on a circular ledge 12ᴬ within the inlet extension 12.

The member 16 is also provided with an outlet opening 16ᶠ (or preferably two of such openings 16ᶠ) forming a longitudinally extending slot in the wall around the chamber 16ᶜ.

In the valve shown in Figs. 1 to 3, the water enters the inlet 12 up to the point of the valve 18ᴮ which when in closed position, as shown in Fig. 1, prohibits the flow thereof through the faucet.

When the operator rod 19 is depressed by pressure upon the head 19ᴬ, the valve 18ᴮ is displaced from its valve seat in the washer 15, and the water is permitted to flow through the opening (or openings) 18ᴰ into the tubular portion 18ᴬ of the piston 18 but the water cannot flow out of such tubular portion 18ᴬ until the upper rim thereof has passed below the upper rim of the chamber 16ᶜ at which time the water will flow into the chamber 16ᶜ, thence through the outlet opening (or openings) 16ᶠ into the annular chamber 13 and through the outlet spout 11.

It will be observed that while the valve 18ᴮ may be fully opened the discharge of the water through the spout 11 is controlled and regulated by the position of the piston portion 18ᴬ relatively to the opening (or openings) 16ᶠ since the amount of the water flowing through the opening 16ᶠ is dependent upon the distance traversed by the piston. It will also be noted that when the valve 18ᴮ is opened the water pressure against the valve is balanced regardless of the distance the piston has traveled or regardless of the amount of water discharged through the faucet spout.

The balanced pressure feature embodied in the present valve is maintained during the closing operation of the valve upon the release of the valve operator 19.

In the closing operation, the piston in its upward movement gradually progressively closes the opening (or openings) 16ᶠ and actually does close such opening (or openings) 16ᶠ before the valve 18ᴮ is seated on its valve seat 15ᴬ to arrest the flow of the water through the opening (or openings) 18ᴰ of the piston. Thus the valve above described is free from sudden closing as by unbalanced pressure conditions. In a valve of the character described, the spring 22 is preferably of light spring stock to provide a minimum of tension required to gradually close the valve and where sufficient pressure of the fluid is maintained to retain the valve in closed position, the spring 22 may be omitted in the event a fully manually operable valve is desired as it is obvious that the valve when once opened may be set to any desired position and will so remain in such set position until closed by manual operation of the operator rod 19.

The modified form of faucet embodying my improved valve as illustrated in Figs. 4, 5, and 6, is of the horizontal type and includes features of simplified construction wherein the casing 10 is provided with an outlet spout 11 and an inlet end 12.

The outlet passage 11ᴬ through the outlet spout 11 and the inlet passage 25 are interconnected by the piston valve chamber 28 in the casing 10.

At one end, the casing 10 as shown in Fig. 4, is provided with a packing chamber 26 which is closed by a packing nut 27 having threaded connection with such casing end and providing a guiding member for the operator rod 19.

The cylindrical piston chamber 28 is of a diameter to form a close fit for the piston 18 and is slightly enlarged at the valve end and provided with a closure member or cap 29 screw-mounted in the open end thereof.

In this modified form of faucet, the piston valve 18 is similar in design and construction to that above-described for the faucet shown in Figs. 1, 2, and 3, and includes the tubular piston portion 18ᴬ, valve portion 18ᴮ and valve extension 18ᶜ. A coil spring 22 may also be provided for automatically closing the valve and in this instance one end of the spring is arranged to abut within the cap 29.

The valve 18ᴮ as shown in Fig. 4, is adapted to seat on a valve seat formed at one end of the piston chamber 28.

As shown in Fig. 4, the valve is in closed position. Pressure on the head 19ᴬ will move rod 19 inwardly to displace the valve 18ᴮ to permit water from inlet passage 25 to pass into piston 18 and when piston 18 moves inwardly it will uncover the somewhat restricted opening 11ᴮ to the outlet passage 11ᴬ and gradually admit an increased flow of the water there through as it moves inwardly.

The balanced pressure features above described with the faucet shown in Figs. 1 to 3 apply equally to the functions or operation of this type of faucet and valve arrangement.

Referring now to the valve as shown in Figs. 7, 8, and 9, which show a modification of my valve invention as applied to a faucet, the casing 10 is provided with an outlet spout 11 and an inlet extension 12.

Within the casing 10 is an enlarged annular chamber 13 at the lower end of which is a seat 14 for a gasket 15.

Within the casing 10 and seated upon the washer 15 is a tubular piston member 35, the upper end of which is enlarged and threaded, as at 36, for screw connection within the upper end of the casing 10. The portion 35 is also provided with a bore 35ᴬ for the valve operator rod 19 and suitable packing 37 and packing nut 38 which is screw-mounted in the upper end of the tubular member 35.

The tubular member 35 is provided with a longitudinally extending slot 39 to provide a fluid discharge from the tubular member into the chamber 13 which is in open communication with the faucet discharge spout 11.

The tubular member 35 is open at the bottom end to receive a tubular piston 40 which is open at the top end and closed at the lower end. Near the bottom end, the piston 40 is provided with an opening 40ᴬ extending within and about half way around the wall of the piston.

The operating rod 19 is provided with a shoulder near its lower end which bears upon the inside face of the bottom of the piston 40 and the rod 19 extends through the piston bottom and is threaded at its lowermost end to receive a securing nut 41 and a washer 42.

The piston 40 is provided with a circular valve 43 located between the bottom of the piston and the washer 42 and securely held by the nut 41 to move with the piston and to constitute a control valve for admitting fluid from the inlet extension 12 and chamber 12ᴬ into the piston 40 through the opening 40ᴬ when the rod 19 is moved downwardly to move the valve 43 from its seat on the bottom of the tubular member 35.

A spring 44 may be provided to automatically close the valve 43 when the rod 19 is released.

As shown in Figs. 7 and 8, the piston opening 40A is provided along a portion of its lower edge with an angular cut or bevel 40B constituting a restricted opening progressively increasing in area from its lowermost end, indicated by X, to its upper end at the lower edge of the opening 40A.

As shown in Fig. 8, the valve is in closed position and when the rod 19 is moved downwardly the valve 43 will be moved to open position as shown in Fig. 7. In the movement of the valve to open position the valve 43 is first displaced from its seat and as it moves downward a restricted but gradually increasing flow of the fluid will pass from the inlet chamber 12A through the opening 40B and then as the opening 40A moves below the valve seat 14 a still greater flow of the fluid will occur through such opening into the piston 40 until the full flow is attained when the opening 40A is below the valve seat 14.

The length of the piston 40 and the arrangement of the top of the elongated slotted discharge 39 are such that while some fluid may enter into the piston 40 at the initial opening of the restricted inlet 40B, the fluid cannot pass over the top of the piston 40 and through the opening 39 into chamber 13 and into outlet 11, until the top of the piston 40 has passed below the upper end of the opening 39. The arrangement is such that when the upper edge of the opening 40A is just below the valve seat 14 only about one-half of the opening 39 has been opened above the top of the piston but as the rod 19 and piston 40 are moved further downwardly, a full opening of the slot 39 will be attained.

It will be observed that although the valve 43 is moved off its seat, the discharge through the spout 11 is controlled and regulated by the position of the piston 40 relatively to opening 39.

When the fluid has passed into the piston through opening 40B the pressures on both sides of the valve 43 are balanced and obviously the balance pressure is maintained during the closing operation of the valve.

Passages 31, 32 and 33 are very small drain passages to drain the piston chamber during the final closing movement of the pistons.

I claim:

1. In a fluid valve, and in combination, a casing, said casing having an inlet passage and an outlet passage, a cylindrical chamber in said casing having an end opening and a side opening connecting said passages, a piston movable in said chamber and adapted to close or open communication between said passages, said piston comprising a tubular member entirely open at one end thereof to permit the flow of fluid from such entirely open end into said outlet passage, a valve member formed integrally with said piston at the opposite end thereof and constituting a closure for said opposite piston end, said piston having an opening in its side wall adjacent said valve and being movable in unison with said valve member, and means for moving said piston and valve to permit the flow of the fluid from said inlet passage around said valve through said opening in the piston side wall and thence through the piston and from its open end through the side opening in said chamber into said outlet passage.

2. In a valve as embodied in claim 1, and including resilient means within said inlet passage exerting pressure against said valve member to retain said valve member and said piston normally in closed position.

3. A valve including a casing having an inlet passage and an outlet passage, said passages being disposed angularly one to the other, a chamber within said casing communicating with both of said passages, said chamber being so arranged in said casing that one end of said chamber communicates with said inlet passage and that said outlet passage communicates with one side of said chamber, a tubular member removably mounted within said casing and extending through said chamber and having one end positioned adjacent one end of said inlet passage, said tubular member having a single elongated longitudinally extending opening in its side wall open to communication with said chamber and said outlet passage, a tubular piston mounted for movement within said tubular member, said piston being open at one end thereof for communication with the interior of said tubular member, and a valve forming a closure for the other end of said piston, said piston having an opening in its cylindrical wall adjacent to said valve, said opening in the cylindrical piston wall being adapted to provide communication between the inlet passage and the interior of said piston, and means for moving said piston and said valve in unison whereby communication is established between said inlet and outlet passages upon the movement of said piston and valve to open communication between the open end of said piston through said elongated opening in the side of wall of said tubular member.

4. In a valve as embodied in claim 3, and including said piston and said valve so arranged that in their closing movement said opening in the side wall of said tubular member will be closed by said piston substantially at the same time said valve is in closed position.

5. In a valve as embodied in claim 1, and including said passages disposed angularly one to the other, and wherein the initial opening and final closing of said valve occur respectively slightly before the opening and slightly after the closing of communication between the said outlet passage and the interior of said cylindrical chamber.

6. In a valve, and in combination, a casing, said casing having an inlet passage and an outlet passage, a cylindrical chamber connecting said passages, said chamber having an opening at one end communicating with said inlet passage and a side opening communicating with said outlet passage, a piston movable in said chamber, said piston being hollow and having one end open and the other closed by a valve connected therewith, said piston having an extended restricted opening decreasing in area from the lower edge of its side wall opening to a point near the bottom of the piston to provide communication between said inlet passage and the interior of said piston, the said open end of said piston being adapted upon movement of said piston to provide communication between the interior of said piston through said cylindrical chamber and its said side opening with said outlet passage, and a valve seat for said piston valve disposed at one end of said cylindrical chamber.

7. In a valve, and in combination, a casing, said casing having an inlet passage and an outlet passage, a cylindrical chamber connecting said passages, said chamber having an opening at one end communicating with said inlet passage and a pair of diametrically opposed side openings communicating with said outlet passage, a piston movable in said chamber, said piston being tubular and having the outlet end thereof entirely open and the opposite closed by a valve connected therewith, said piston having an opening in its side wall near said valve to provide communication between said inlet passage and the interior of said piston, the said open end of said piston being adapted upon movement of said piston to provide communication between the interior of said piston through said cylindrical chamber and its said side openings with said outlet passage, and a valve seat for said piston valve disposed at one end of said cylindrical chamber.

JOSEPH WITTEK.